(12) United States Patent
Stelter

(10) Patent No.: US 8,012,644 B2
(45) Date of Patent: Sep. 6, 2011

(54) FUEL CELL STACK

(75) Inventor: Michael Stelter, Chemnitz (DE)

(73) Assignee: Staxera GmbH, Dresden (DE)

( * ) Notice: Subject to any disclaimer, the term of this patent is extended or adjusted under 35 U.S.C. 154(b) by 1100 days.

(21) Appl. No.: 10/542,729

(22) PCT Filed: Feb. 19, 2004

(86) PCT No.: PCT/DE2004/000306
§ 371 (c)(1),
(2), (4) Date: Jul. 20, 2005

(87) PCT Pub. No.: WO2004/075324
PCT Pub. Date: Sep. 2, 2004

(65) Prior Publication Data
US 2006/0073374 A1    Apr. 6, 2006

(30) Foreign Application Priority Data

Feb. 20, 2003    (DE) .................................. 103 07 278

(51) Int. Cl.
*H01M 8/24*    (2006.01)
*H01M 8/04*    (2006.01)
(52) U.S. Cl. ........ 429/457; 429/456; 429/452; 429/471; 429/514
(58) Field of Classification Search .................... 429/39, 429/26, 32, 38, 24, 35
See application file for complete search history.

(56) References Cited

U.S. PATENT DOCUMENTS

| | | | |
|---|---|---|---|
| 444,851 A * | 1/1891 | Maru ............................ 83/441.1 |
| 4,444,851 A | 4/1984 | Maru | |
| 4,604,332 A | 8/1986 | Warszawski et al. | |
| 5,541,015 A * | 7/1996 | Tajima et al. ................... 429/26 |
| 5,811,202 A | 9/1998 | Petraglia | |

(Continued)

FOREIGN PATENT DOCUMENTS

EP    1 248 310 A1    10/2002

(Continued)

OTHER PUBLICATIONS

A.J. Appleby, Fuel Cell Handbook, Van Nostrand Reinhold International Company Limited, New York, New York, 1989, pp. 450-451.

(Continued)

*Primary Examiner* — Barbara L. Gilliam
*Assistant Examiner* — Angela J. Martin
(74) *Attorney, Agent, or Firm* — Roberts Mlotkowski Safran & Cole, P.C.; David S. Safran

(57) ABSTRACT

A fuel cell stack with a plurality of fuel cell elements which are layered on one another with separating plates located between the fuel cell elements. Inside channels are formed to supply a combustion gas and discharge the exhaust gas. The fuel cell stack is characterized in that, on a first side of the fuel cell elements, several parallel lengthwise channels are formed for routing of the combustion gas, and on the ends of the channels, a distributor zone is formed which connects the supply channel to the respectively first ends of the lengthwise channels, and a collecting zone is formed which connects the discharge channel to the second ends of the lengthwise channels, and that there is an oxidizer guide on the second side of the fuel cell elements, the oxidizer guide running in the direction of the lengthwise channels.

10 Claims, 5 Drawing Sheets

U.S. PATENT DOCUMENTS 6,261,710 B1 7/2001 Marianowski
2004/0038102 A1* 2/2004 Beckmann et al. ............. 429/32

FOREIGN PATENT DOCUMENTS

| EP | 1 255 315 A1 | 11/2002 |
| JP | 59-188679 U | 12/1984 |
| JP | 07-296831 | * 11/1995 |
| JP | 7-296831 A | 11/1995 |

OTHER PUBLICATIONS

English Translation of Japanese Examination Report Dated Sep. 6, 2010.

* cited by examiner

FUEL CELL STACK

BACKGROUND OF THE INVENTION

1. Field of Invention

The invention relates to a fuel cell stack with a plurality of fuel cell elements which are layered on one another with separating plates located in between. At least one inside supply channel is provided to supply a combustion gas and at least one inside discharge channel is provided to discharge an exhaust gas, the channels extending in the stacking direction of the fuel cell elements.

2. Description of Related Art

Fuel cell stacks are used since a single fuel cell element produces only a very low voltage. In order to produce a voltage which can be used for application purposes, therefore several fuel cell elements are connected in series so that the cell voltages are added to one another. The fuel cell elements are arranged on one another such that, between the fuel cell elements and the separating plates, a respective intermediate space, on one side of the fuel cell element, a combustion gas and on the other side of the fuel cell element, an oxidizer being made available. The intermediate spaces for the combustion gas and the oxidizer are conventionally made in the form of several channels so that, between the channels, there is positive electrical contact between the fuel cell elements and the separating plates. In this way, the heat and current produced in the fuel cells can be discharged.

The combustion gases for fuel cell elements are hydrogen or a hydrogen-containing gas which is, accordingly, critical with respect to handling. Hydrogen-containing gas which escapes as a result of a fault or leak would react uncontrollable, for example, with the atmospheric oxygen and result in at least damage to the fuel cell stack. Therefore, the use of internal supply and discharge channels is known. For this purpose, in the individual fuel cell elements and the separating plates located in between, there are recesses which form channels in the assembled state of the fuel cell stack. Around the recesses are seals so that, with the corresponding bracing of the fuel cell stack, a tight channel is formed. The required tightness can be better ensured in this way than in external combustion gas supply.

A. J. Appleby; *Fuel Cell Handbook*, Van Nostrand Reinhold, New York, 1989 on pages 450 ff., discloses different versions of the supply of combustion gas and oxidizers. In a first version, there are guides for the combustion gas and the oxidizer such that the directions of the gas flows cross. The gas guides are open on the respective sides of the fuel cell stack, the respective gas flowing against the sides of the fuel cell stack. Fuel cell stacks in this so-called cross-flow technology, however, have a comparatively poor power density. Moreover, the external supply of combustion gas is problematic with respect to tightness and the unintentional escape of hydrogen-containing combustion gas.

In the second version shown, the combustion gas is routed via internal supply channels to the respective fuel cell elements. The oxidizer is supplied externally and is routed along the side of the fuel cell element which is the other one at the time in the transverse direction to the flow direction of the combustion gas.

A third version shows how the combustion gas and the oxidizer can be supplied so that a parallel flow direction of the two gases arises. This co-current technology or principle which is called counter-flow technology for the opposite flow direction has the advantage that the temperature distribution and the gas concentration are more uniform. The disadvantage is that a large number of feed channels and discharge channels must be provided; this results in a large number of seals and the associated tightness problems. Moreover, outside of the fuel cell stack, the effort for supply and discharge of the gases to the supply and discharge channels is very high; this makes fuel cell systems with these fuel cell stacks comparatively expensive. Also, the internal feed of oxidizers is disadvantageous because a high pressure loss occurs due to the complicated line routing, and thus, the oxidizer flow rate is limited. For compensation purposes, there can be stronger fans; however, this results in additional costs. In addition, the efficiency of the overall system deteriorates since increased driving power is necessary for the stronger fans.

External feed of the oxidizer in combination with co-current or countercurrent technology has not been feasible to date since, as a result of the feed and discharge channels for the combustion gas, there are too many components in the flow path, and therefore, a sufficient oxidizer flow rate cannot be achieved.

The limited oxidizer flow rate, in particular, has the disadvantage that the heat which is formed in the fuel cells is not adequately dissipated by the oxidizer, for example, air. The lower the flow rate of the oxidizer or air, the greater the danger of overheating of the fuel cell stack.

Another disadvantage in the known fuel cell stacks in co-current technology is that, as a result of the numerous supply and discharge channels, a large number of braces for the stack is necessary in order to ensure the required tightness. In this way, the fuel cell stack becomes very massive; this means increased construction effort, and thus, increased costs.

SUMMARY OF THE INVENTION

A primary object of the present invention is, therefore, to devise a fuel cell stack which works in co-current technology or countercurrent technology and nevertheless enables simple system linkage while ensuring a high oxidizer flow rate.

This object is achieved by a fuel cell stack of the initially mentioned type which is characterized in that, on the first side of the fuel cell elements, there are several lengthwise channels which run parallel to each other for routing of the combustion gas, a distributor zone which connects the supply channel to the respectively first ends of the lengthwise channels, and a collecting zone which connects the discharge channel to the end of the lengthwise channels which is the second end at the time, and on the second side of the fuel cell elements an oxidizer guide is formed which runs in the direction of the lengthwise channels and which is open to the sides of the fuel cell stack for supply of the oxidizer.

Due to the distributor zones and collecting zones which are provided in the accordance with invention, the supply channel and the discharge channel can be arranged such that there are no components in the flow path of the oxidizer. The oxidizer can thus be supplied externally; this makes the structure of the fuel cell system with the fuel cell stack of the invention simple and economical. The supply channel and the discharge channel can be provided on the same side of the fuel cell stack so that strong bracing is necessary only on that side of the fuel cell stack.

Since only the combustion gas is supplied internally, there is enough space for the distributor and collecting zone. Therefore, the fuel cell stack can be implemented with only one supply channel and only one discharge channel; this greatly reduces the number of penetrations per plate, and thus, only very few seals are necessary.

The fuel cell stack according to the invention has the advantage of improved cooling by an increased flow rate of the oxidizer, a simpler and more economical structure, and increased reliability. Bracing of the fuel cell stack is only possible in a small area around the seals, by which the fuel cell stack becomes very light; this results in higher vibration tolerance and less construction effort.

In one advantageous configuration of the fuel cell stack, the distributor zone and the discharge zone taper proceeding from the supply channel and the discharge channel along the ends of the lengthwise channels. In this way, an especially uniform pressure distribution is achieved.

The invention is explained in detail below with reference to the accompanying drawings which show several versions of the invention by way of example.

DETAILED DESCRIPTION OF THE INVENTION

Figure 1:
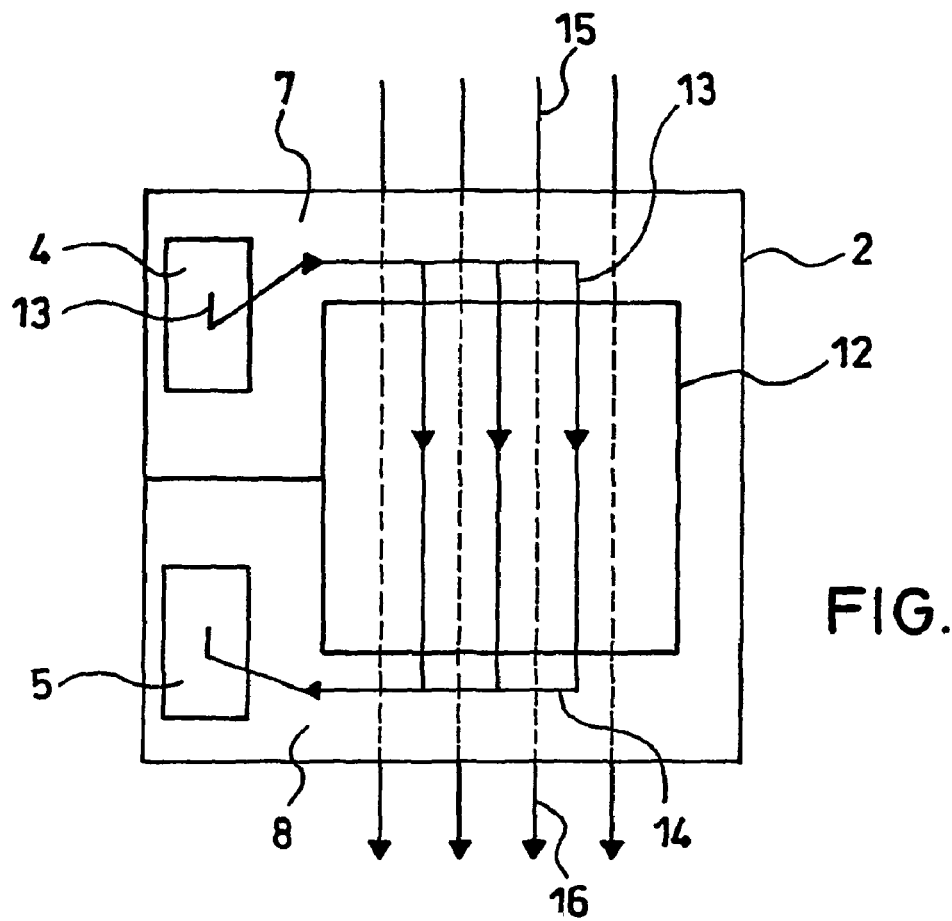
FIG. 1 is a schematic of a fuel cell element with the flow directions of the combustion gas and the oxidizer.

FIG. 1 is a plan view of a fuel cell element 2 from which it can be seen that combustion gas 13 flows over the active area 12 of the fuel cell element 2. The combustion gas is supplied via a supply channel 4 to the fuel cell element 2. The supply channel 4 is formed by openings in the fuel cell elements which are stacked on top of one another and in the separating plates which are located in between them. The combustion gas 13 is routed over the active area 12 of the fuel cell element 2 in lengthwise channels which, however, cannot be recognized in FIG. 1 since they are formed by profiling of the separating plates which are located between the fuel cell elements. Between the supply channel 4 and the entry area of the combustion gas 13 into the lengthwise channels, over the active area 12, a distributor zone 7 is formed in which the combustion gas which is supplied through the supply channel 4 is divided among the individual lengthwise channels.

The lengthwise channels end on the opposite side of the active area 12 and the reacted combustion gas which emerges as exhaust gas is collected in a collecting zone 8 and discharged via the discharge channel 5.

On the other side of the fuel cell element 2, in FIG. 1 on the bottom, oxidizer 15, in the simplest case air, is routed over the bottom of the active area 12. The flow direction of the oxidizer runs in the same direction as the combustion gas 13 here.

By the lateral arrangement of the supply channel 4 and the discharge channel 5, the bordering sides of the fuel cell element 2 are free for the external supply of the oxidizer 15, the flow of which is not inhibited by the channels which run there, as would be the case in the initially described arrangement as in the prior art. The oxidizer 15 leaves the fuel cell element on the opposite side as exhaust air 16.

In the distributor zone 7 and the collecting zone 8, combustion gas and air are routed very closely past one another, separated only by a thin layer of material. Moreover, since the surfaces of the distributor zone 7 and of the collecting zone 8 are comparatively large, a heat exchanger function is achieved so that the different temperatures of the two gas flows can be matched to one another. In this way, in the fuel cell stack, a uniform temperature distribution is achieved, i.e., unwanted thermo-mechanical stresses are reduced. Equalization of the temperature takes place in the area of the distributor zone 7 and the collecting zone 8, which are much less sensitive than the active area 12 of the fuel cell element 2.

The surfaces of the distributor zone 7 and of the collecting zone 8 can be selected independently of the active surface 12 of the fuel cell element 2. Thus, the above described heat exchanger function or cooler function can be enhanced without degrading the incident flow on the active surface 12. This is an advantage over known designs.

Figure 2:
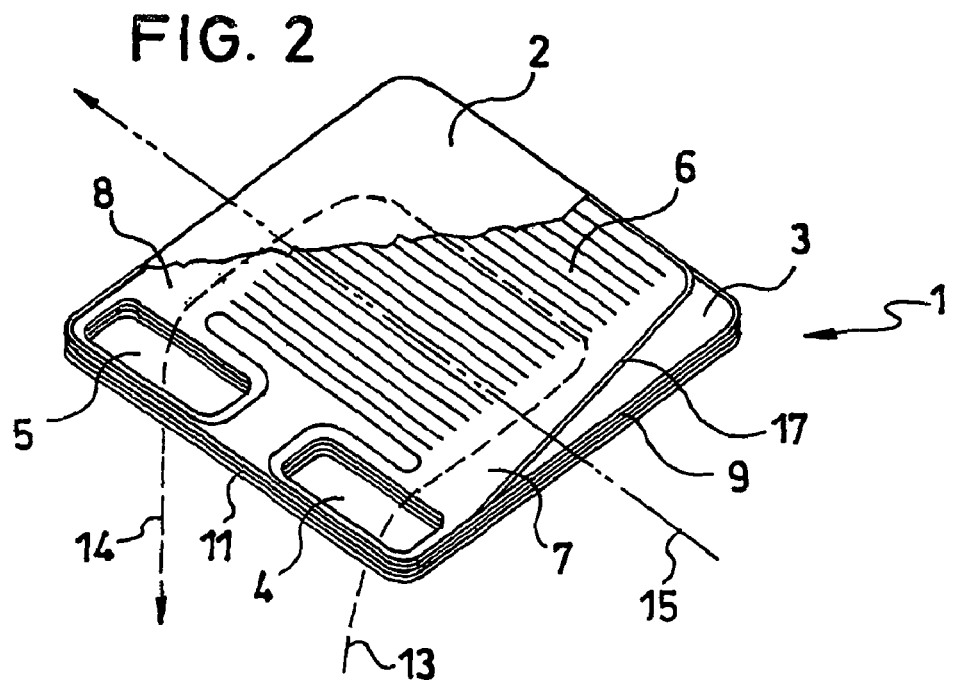
FIG. 2 is a three-dimensional representation of the fuel cell stack with several fuel elements.

FIG. 2 shows a more specific configuration of a fuel cell stack in accordance with the invention in a perspective view. The fuel cell stack 1 is cutaway on its top so that the separating plate 3 which lies under the fuel cell element 2 is visible. On the top of the separating plate 3, lengthwise channels 6 are formed through which the combustion gas 13 is routed and leaves the fuel cell stack as exhaust gas 14.

The distributor zone 7 is formed, in the version from FIG. 2, by there being a bridge 17 which is spaced away from the ends of the lengthwise channels 6 and which borders the area between the ends of the lengthwise channels 6 and the edge of the separating plate 3. The combustion gas 13 flowing through the supply channel 4 can be divided among the individual lengthwise channels 6 in the distributor zone 7. The distributor zone 7, in this embodiment, is made such that it tapers along the ends of the lengthwise channels, by which the pressure distribution is improved. The top of the separating plate 3 is profiled such that the combustion gas which enters through the supply channel 4 cannot flow directly to the discharge channel 5, but must pass through the lengthwise channels 6 to do this.

On the other side of the lengthwise channels 6, a collecting zone 8 is formed which is made in the same way as the distributor zone 7.

The oxidizer 15 flows parallel to the direction of the lengthwise channels 6 on the other side of the separating plate, and thus, along the underlying fuel cell element. The areas to the side of the lengthwise channels 6, where the distributor zone 7 and the collecting zone 8 are located, are comparatively large. This yields additional cooling surfaces and heat exchanger surfaces since the oxidizer 15 likewise flows past these surfaces and dissipates the heat which has been produced in the fuel cell element 2.

Figure 3:
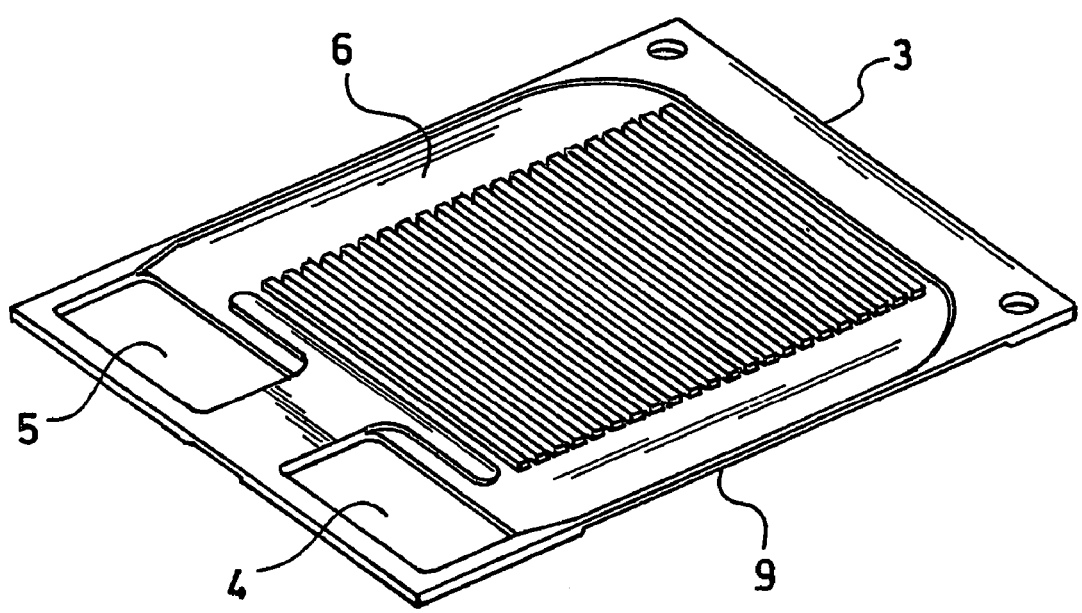
FIG. 3 is a three-dimensional representation of a separating plate.

FIG. 3 shows a separating plate 3 in detail. Lengthwise channels are formed by a plurality of parallel grooves on the top of the separating plate 3. Between the supply channel 4 and the discharge channel 5 the thickness of the separating plate 3 is such that the entering gas cannot flow directly to the discharge channel 5, since the separating plate in this area positively adjoins the overlying fuel cell element. On the bottom of the separating plate 3, there is an oxidizer guide 9 which extends in the direction of the lengthwise channels 6 on the top of the separating plate 3. The bottom of the separating plate is adjoined, of course, by the other fuel cell element, but since all of the separating plates 3 are equipped the same, in the installed state, on the top of a fuel cell element which rests on the separating plate 3, another separating plate 3 would rest, so that the oxidizer guide 9 borders on the other side of the fuel cell element.

There are likewise several channels for routing the oxidizer. Here, it is favorable if the separating plates 3 are made corrugated in the section which borders on the active area 12 so that the channels for the combustion gas 13 and for the oxidizer 15 are offset. Due to this execution of the channels, the material of the separating plates 3 has a very intense superficial contact with the active surface 12 which is further improved by flattened areas in the contact region. In this way, current and heat are discharged very effectively from the fuel cell 2, especially better than if there are only spot or grid support surfaces 12. However, at the same time, as a heat transfer medium, the gas flows are routed to very near the active surface 12, specifically, are only separated by the material thickness of the separating plate 3. This improves the heat transfer to the gas flows.

Figure 4:
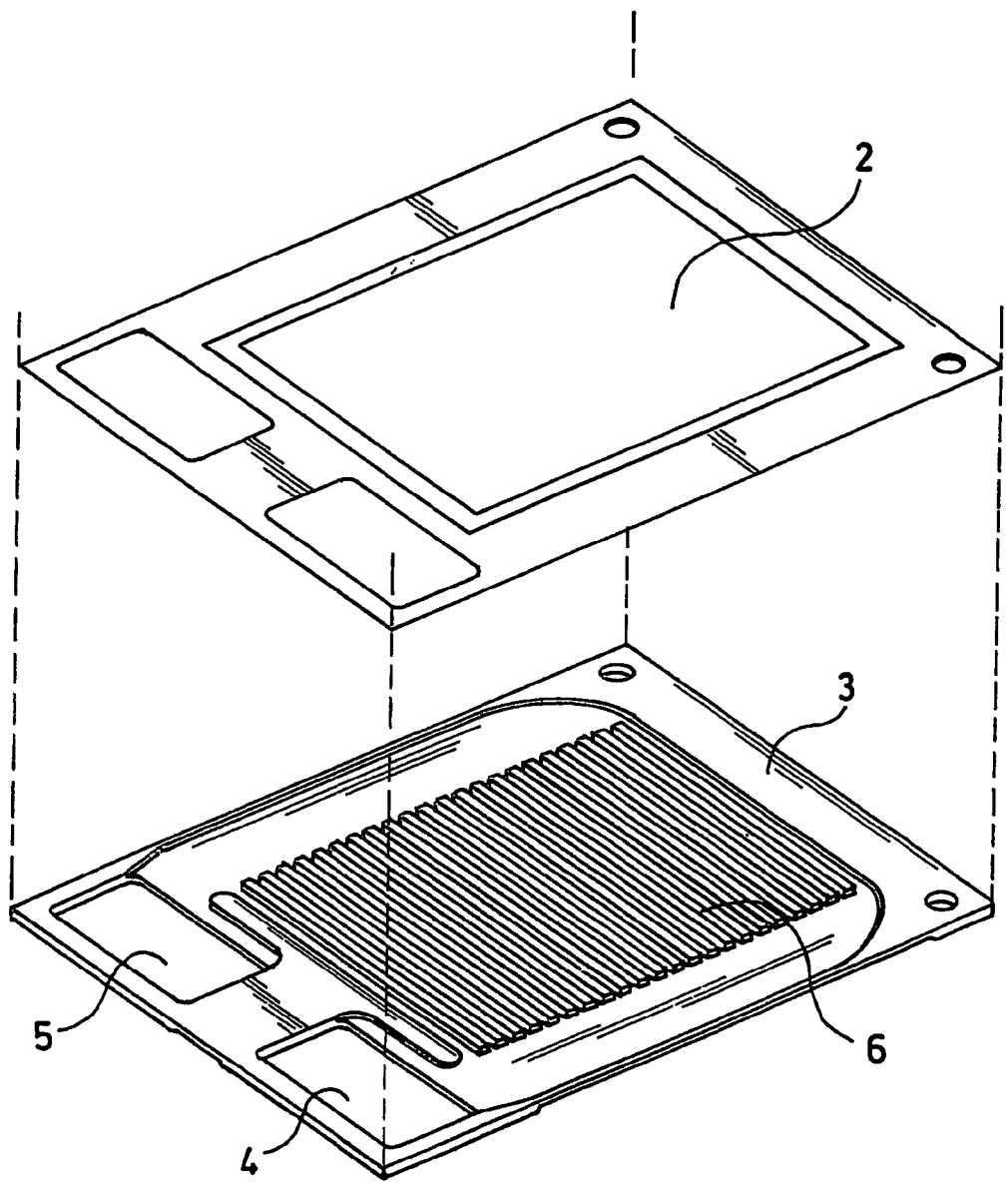
FIG. 4 is an exploded view showing the assignment of a fuel cell element to a separating plate.

FIG. 4 shows how the fuel element from FIG. 3 and the fuel cell element are joined. Here, it can be seen, in particular, that the openings in the fuel cell element 2 and the separating plate 3 come to rest on top of one another to form the supply channel 4 and the discharge channel 5.

Figure 5:
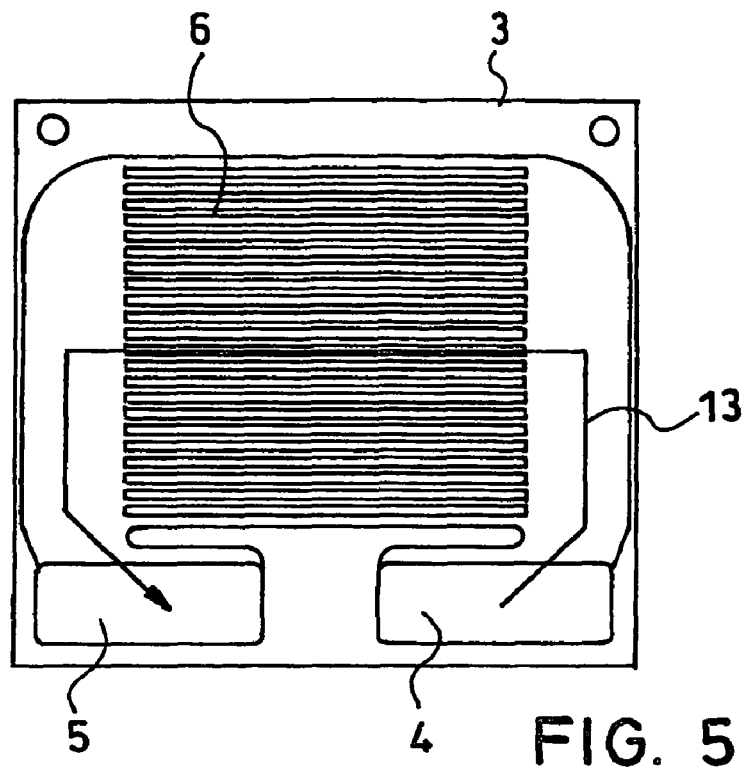
FIG. 5 shows the arrangement of the supply and discharge channel in a first version of the invention.
Figure 6:
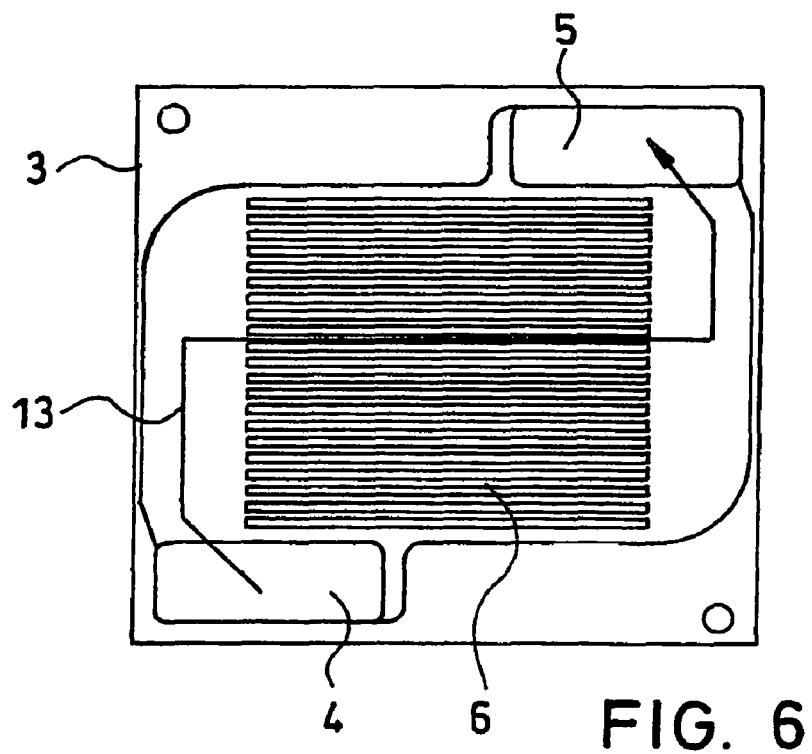
FIG. 6 shows the arrangement of the supply and discharge channel in a second version of the invention.

FIG. 5 shows a top view of one version of a separating plate 3 with the flow direction of the combustion gas indicated. The supply channel 4 and the discharge channel 5 are located on the same side of the separating plate 3, and thus, of the fuel cell stack. One alternative arrangement is shown in FIG. 6. In this case, the openings which are provided for forming the supply and discharge channel are in the area of diagonally opposite corners of the separating plates 3 and the fuel cell elements. This arrangement can be advantageous if a very uniform distribution of the combustion gas concentration in the fuel cell element is important, since the paths to be traversed and the pressure distributions are the same with respect to each lengthwise channel.

Figure 7:
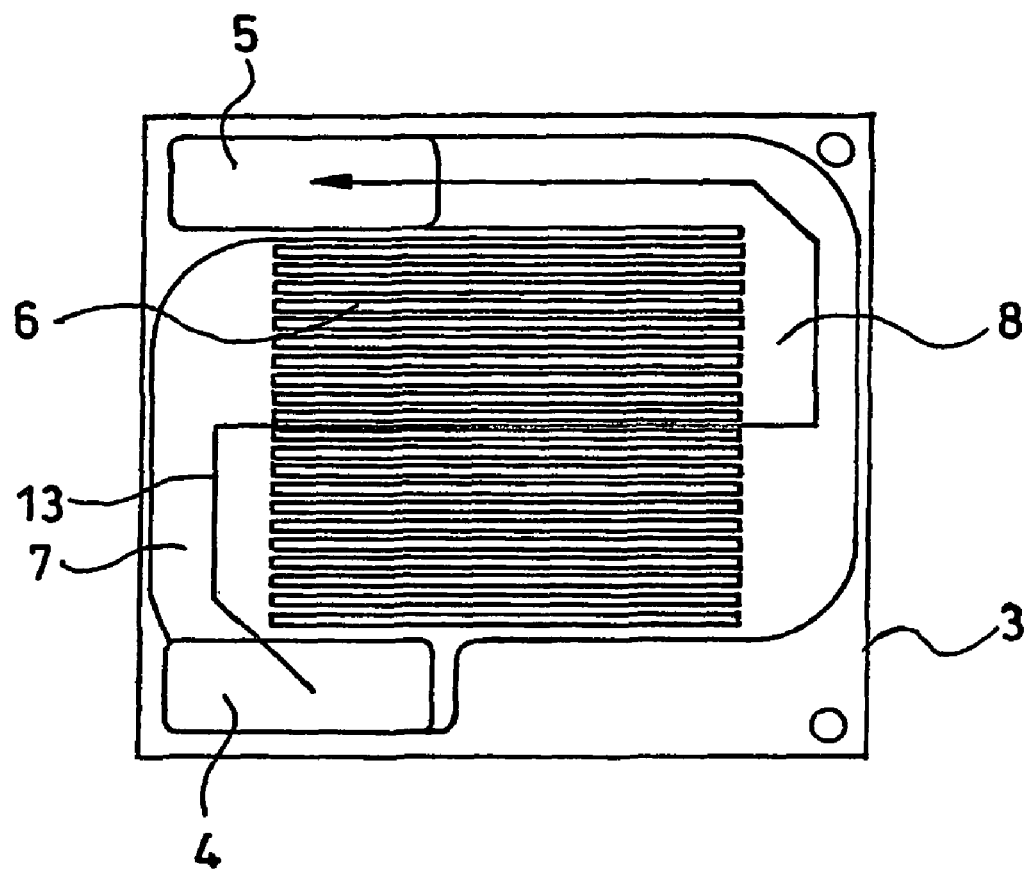
FIG. 7 shows the arrangement of the supply and discharge channel in a third version of the invention.

Another alternative for the arrangement of the openings is shown in FIG. 7. There are openings there both for the supply channel 4 and the discharge channel 5 on the side of the first ends of the lengthwise channels 6. Therefore, the openings are located where the combustion gas 13 flows into the lengthwise channels 6.

Which of the alternatives shown in FIGS. 5 to 7 is chosen depends on the respective construction requirements, especially how the system components which are located outside of the fuel cell stack are to be arranged.

The invention claimed is:

1. Fuel cell stack, comprising:
a plurality of fuel cell elements and
a plurality of separating plates, a respective one of the separating plates being located between a respective pair of fuel cell elements,
at least one inside supply channel being provided to supply a combustion gas and at least one inside discharge channel being provided to discharge an exhaust gas, said channels extending in a direction in which the fuel cell elements and separating plates are stacked,
a supply of combustion gas on a top side of the fuel cell elements and a supply of oxidizer on a bottom side of the fuel cell elements,
wherein, on the top side of the fuel cell elements, there are provided:
a plurality of parallel lengthwise channels for routing of the combustion gas,
a distributor zone which connects the supply channel to first ends of the lengthwise channels, and
a collecting zone which connects the discharge channel to second ends of the lengthwise channels, and
wherein oxidizer guide channels are provided at the bottom side of the fuel cell elements for routing the oxidizer parallel to the direction of the lengthwise channels, the oxidizer guide channels being open to sides of the fuel cell stack for supplying of the oxidizer, wherein the oxidizer guide channels and the lengthwise channels are laterally offset relative to each other.

2. Fuel cell stack as claimed in claim 1, wherein the at least one supply channel and the at least one discharge channel are located in an area at one side of the fuel cell stack.

3. Fuel cell stack as claimed in claim 1, wherein the at least one supply channel and the at least one discharge channel are arranged by diagonally opposite corners of the fuel cell stack.

4. Fuel cell stack as claimed in claim 1, wherein the distributor zone tapers from the supply channel along the first ends of the lengthwise channels and the collecting zone tapers from the discharge channel along the second ends of the lengthwise channels.

5. Fuel cell stack as claimed in claim 1, wherein the distributor zone and the collecting zone are made symmetrical with respect to the fuel cell elements.

6. Fuel cell stack as claimed in claim 1, wherein the distributor zone and the collecting zone are provided with cooling surfaces.

7. Fuel cell stack as claimed in claim 1, wherein at least one of the distributor zone and the collecting zone have heat exchange surfaces by which heat energy is transferable between the combustion gas and the oxidizer.

8. Fuel cell stack as claimed in claim 1, wherein the top and bottom sides face in opposite directions toward a respective separating plate.

9. Fuel cell stack as claimed in claim 1, wherein the oxidizer guide channels are provided directly in a surface of the separating plate located between each respective pair of fuel cell elements.

10. Fuel cell stack as claimed in claim 1, wherein the at least one supply channel and the at least one discharge channel are located in an area laterally to the same side of the parallel lengthwise channels and are connected there to via the distributor zone and the collecting zone, respectively.

* * * * *